United States Patent
Egawa et al.

(10) Patent No.: US 7,522,297 B2
(45) Date of Patent: Apr. 21, 2009

(54) PRINT INSTRUCTION APPARATUS AND PRINT INSTRUCTION METHOD

(75) Inventors: Satoshi Egawa, Saitama (JP); Hideaki Sugimoto, Saitama (JP); Hideaki Takayama, Saitama (JP); Kazunobu Uchiyama, Saitama (JP); Hiroyuki Watanabe, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 981 days.

(21) Appl. No.: 10/385,647

(22) Filed: Mar. 12, 2003

(65) Prior Publication Data

US 2004/0057073 A1 Mar. 25, 2004

(30) Foreign Application Priority Data

Sep. 20, 2002 (JP) ............................. 2002-276062

(51) Int. Cl.
*B41F 1/00* (2006.01)
*G06F 15/00* (2006.01)

(52) U.S. Cl. ...................... 358/1.14; 358/1.15; 358/1.18

(58) Field of Classification Search ................ 358/1.15, 358/1.18, 1.13, 296, 1.14; 400/61; 235/462.45; 395/116, 112, 114; 709/206; 707/7, 104.1, 707/8, 2; 396/661; 345/835, 342; 715/838; 351/206

See application file for complete search history.

(56) References Cited

U.S. PATENT DOCUMENTS

| | | | | |
|---|---|---|---|---|
| 5,442,732 A * | 8/1995 | Matysek et al. | ............ | 358/1.17 |
| 6,025,841 A * | 2/2000 | Finkelstein et al. | ......... | 715/803 |
| 6,054,988 A * | 4/2000 | Alimpich et al. | ............ | 715/769 |
| 7,051,012 B2 * | 5/2006 | Cole et al. | ...................... | 707/2 |
| 7,059,721 B2 * | 6/2006 | Hayashi et al. | ............. | 351/206 |
| 7,302,649 B2 * | 11/2007 | Ohnishi | ....................... | 715/838 |
| 2001/0013877 A1 * | 8/2001 | Fujino | ......................... | 345/835 |

(Continued)

FOREIGN PATENT DOCUMENTS

JP       A 2000-53218       2/2000

(Continued)

OTHER PUBLICATIONS

Akira Watanabe, Technique for Making Full Use of Outlook by 120%, Oh!PC, Japan, Soft Bank Publishing Corporation, Oct. 15, 1997, vol. 16, No. 10, p. 187.

(Continued)

*Primary Examiner*—King Y Poon
*Assistant Examiner*—Allen H Nguyen
(74) *Attorney, Agent, or Firm*—Oliff & Berridge, PLC

(57) ABSTRACT

In print instruction apparatus for giving printing apparatus an instruction as to print conditions required for printing print data, a "Print Instruction" folder 61 having folders of respective items of the print conditions below the "Print Instruction" folder, a "Print Status" folder for confirming the print status, and the print data are displayed on a screen of a display portion of the print instruction apparatus. The "Print Status" folder has a "Finished Print Job" folder, an "Ongoing Print Job" folder and a "Reserved Print Job" folder. When print data is moved or copied to any one of these folders, processing is executed in accordance with the contents of the folder to which the print data is moved or copied, while the respective statuses of ongoing print jobs, reserved print jobs and finished print jobs are displayed.

20 Claims, 8 Drawing Sheets

U.S. PATENT DOCUMENTS

| | | | |
|---|---|---|---|
| 2002/0018656 A1* | 2/2002 | Shioji | 396/661 |
| 2002/0063877 A1* | 5/2002 | Lucivero et al. | 358/1.13 |
| 2002/0196460 A1* | 12/2002 | Parry | 358/1.15 |
| 2006/0059198 A1* | 3/2006 | Uchida et al. | 707/104.1 |

FOREIGN PATENT DOCUMENTS

| | | |
|---|---|---|
| JP | 2000-276313 | 10/2000 |
| JP | 2001-277663 | 10/2001 |
| JP | 2001-337801 | 12/2001 |

OTHER PUBLICATIONS

English translation of Japanese Office Action.

* cited by examiner

PRINT INSTRUCTION APPARATUS AND PRINT INSTRUCTION METHOD

BACKGROUND OF THE INVENTION

1. Field of the Invention

The present invention relates to print instruction apparatus and a print instruction method, and particularly relates to print instruction apparatus and a print instruction method for giving instructions to printing apparatus such as a printer while setting print conditions for printing print data.

2. Description of the Related Art

Heretofore, when printing is performed by printing apparatus such as a printer, print data is normally transmitted from host apparatus such as a personal computer (PC) connected to the printing apparatus through a printer driver belonging to the host apparatus. In this case, for example, when a user gives an instruction to print print data made up by a desired application on the host apparatus side, a printer driver corresponding to a printer desired to output therefrom by the user is called, and the print data is converted into a predetermined control code such as a PDL (Page Description Language) that can be interpreted by the printer, so that the print data is outputted to the printer. In addition, through the printer driver, the user can specify print conditions for the print data, such as the paper size, the number of sheets to be outputted, the number of copies, double-sided/single-sided printing, and the existence of sorting. Thus, the print data can be outputted in a desired format.

According to a UI (User Interface) screen for setting print conditions in the printer driver as mentioned above, the print conditions are normally set on a screen selected from a plurality of screens through tabs or the like. However, it is very difficult to know where a setting part for setting a desired function on the UI screen is located on the UI screen of the printer driver. In addition, the configuration of the UI screen of a printer driver by one printer maker differs from that by another printer maker. It will be therefore more difficult to know where the setting part is located if the user operates a printer driver not used usually by the user. Further, when a related-art printer driver used in a PC or the like is applied directly to a portable telephone set or a portable terminal unit such as a PDA (Personal Digital Assistant) unit, the display screen of the portable telephone set or the portable terminal unit is so small in comparison with that of the PC, that the UI screen of the printer driver cannot be displayed entirely and properly in the display screen area. Thus, the user-friendliness may deteriorate remarkably. It can be therefore conceived that the screen is divided into more component screens than in the printer driver for PC so that the display can be attained even in a portable telephone set or a portable terminal unit. However, the component screens are so many that the user-friendliness deteriorates remarkably also in this case.

In consideration of such a situation, the present inventor proposed printing apparatus, a print instruction method and print instruction apparatus in Japanese Patent Application No. 2000-053218, which can be applied not only to the case that a print instruction is issued from a PC but also to the case that a print instruction is issued from a portable telephone set or a portable terminal unit having a small display screen, and which is provided with a folder type printer UI superior in user-friendliness. According to this invention, when a print instruction of print data is issued, a desired combination of print setting folders for setting a plurality of print condition items hierarchically in advance is specified hierarchically by operating a file of the print data. Thus, the print conditions of the print data are established.

As a result, the user can give print instructions with various conditions to the printer without installing any dedicated printer driver or any application software. In addition, unlike the UI screen in an ordinary printer driver, the user does not have to change over from one screen to another screen through a plurality of tabs to look for a part for setting print conditions desired by the user. Thus, even a user making an operation for the first time can issue a print instruction easily. Further, by selecting a print setting folder in the undermost tier, and dragging and dropping an icon of print data into the selected folder, the print data and the information of the print conditions set thus can be transmitted from the print instruction apparatus to the printing apparatus. Thus, the user-friendliness for print instructions is improved.

However, according to the print instruction apparatus and the print instruction method in the related art, the user cannot confirm the execution status of a print instruction issued by the user, or the user cannot make an operation about an ongoing job, a ready job, a finished job, etc. For example, when the user moves or copies print data to a print setting folder so as to issue a print instruction, the user cannot grasp the print status until the user sees the contents on paper outputted by execution of printing. Thus, the user has no way to know how many jobs have been transmitted to the printer or what number a transmitted job will be processed.

In addition, it is indeed supposed to print data that an upper terminal unit cannot deal with (data whose contents cannot be confirmed), but an image of the printing result of such data cannot be given to the user. Further, since the history of finished print jobs cannot be confirmed, correct information as to whether printing a document instructed to print by the user is finished or not cannot be told to the user. In addition, when data transmitted once is to be printed again, it is necessary to send the data again.

SUMMARY OF THE INVENTION

The present invention has been made in view of the above circumstances, and therefore an object of the invention is to provide print instruction apparatus and a print instruction method which make it possible not only to confirm execution status about any ongoing print job but also to change print conditions and reprint print data in any case of a canceled print job, an ongoing print job and a finished print job to thereby result in improvement in user-friendliness.

In order to achieve the object, according to one aspect of the invention, there is provided a print instruction apparatus for presenting print conditions required for printing print data to printing apparatus, including: a display unit for displaying print instruction folders on a screen, the print instruction folders showing the print conditions with folders associated with print condition items respectively, so as to allow a user to select a desired one of the folders on the screen; and a control unit for making the display unit display print status folders for confirming print status together with the print instruction folders.

Also, according to another aspect of the invention, there is provided a print instruction method for setting print conditions through print instruction apparatus and printing print data under the print conditions through printing apparatus, including the steps of: displaying print instruction folders and print status folders on a display portion of the print instruction apparatus, the print instruction folders showing the print conditions with folders associated with print condition items respectively, the print status folders allowing a user to confirm print status; and executing processing corresponding to item contents of a desired folder of the print status folders when print data is moved or copied to the desired folder, while displaying ongoing print data whose print job is ongoing, reserved print data whose print job is reserved, and finished print data whose print job is finished, on the display portion.

According to the invention, the print status folders for confirming print status is displayed together with the print instruction folder for setting print conditions. Not only is it possible to confirm execution status about any ongoing print job but it is also possible to change print conditions and reprint print data in any case of a canceled print job, an ongoing print job and a finished print job. Thus, it is possible to improve the user-friendliness.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Figure 1:
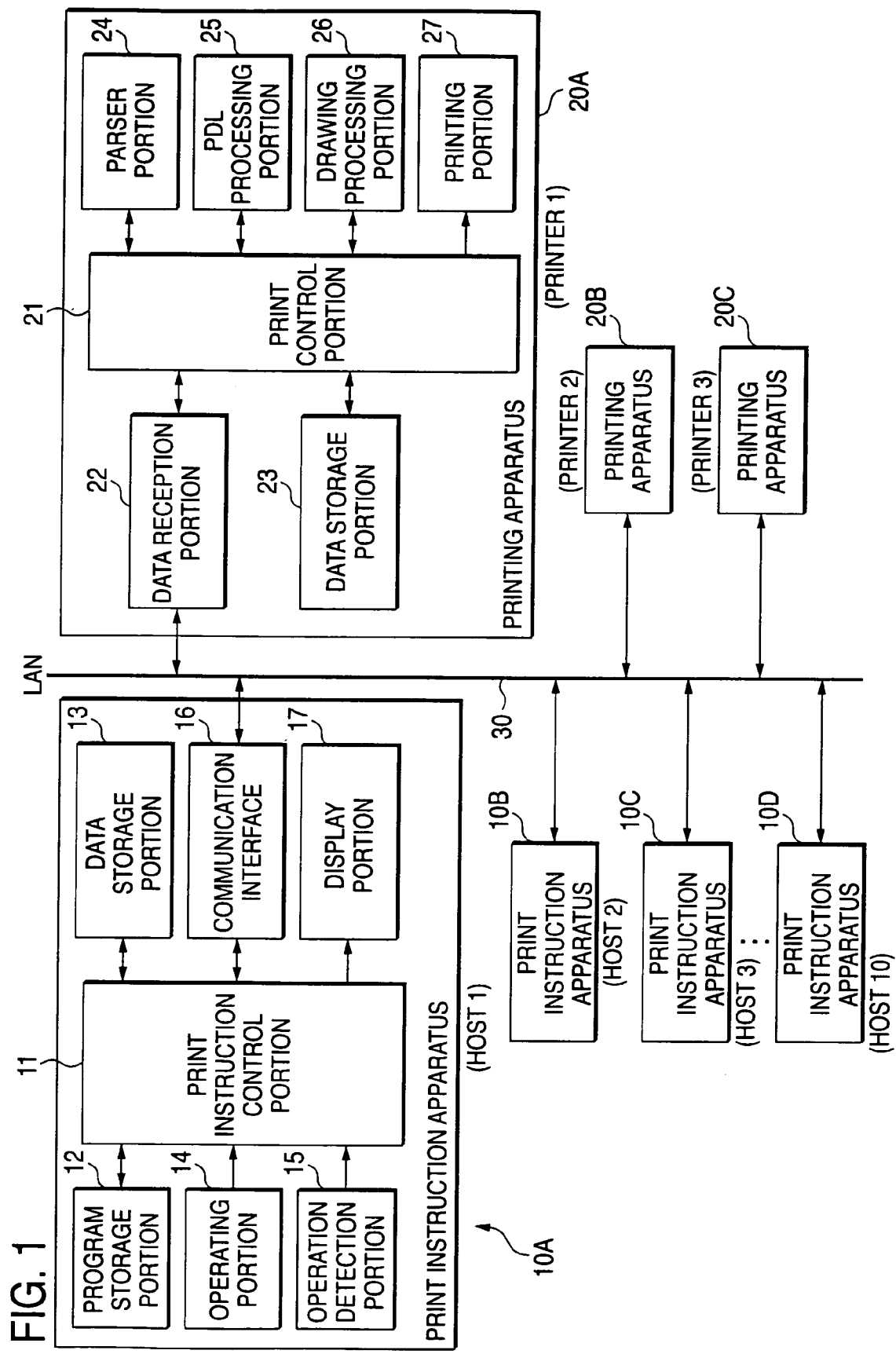
FIG. 1 is a block diagram showing the configuration of print instruction apparatus according to the invention and printing apparatus connected to the print instruction apparatus.

FIG. 1 shows the configuration of print instruction apparatus according to the invention and the configuration of printing apparatus connected to the print instruction apparatus. For example, each piece of print instruction apparatus 10A, 10B, 10C, 10D (although the number of pieces of print instruction apparatus is assumed to be 10 here, it may be any desired number in fact) as each piece of host apparatus or upper apparatus is a personal computer (PC) or a portable information terminal unit such as a PDA unit or a portable telephone set. These pieces of print instruction apparatus are connected to pieces of printing apparatus 20A, 20B and 20C (although the number of pieces of printing apparatus is assumed to be 3 here, it may be any desired number in fact) through a LAN (Local Area Network) 30. Each piece of printing apparatus 20A, 20B, 20C (PRINTER 1, 2, 3) is a printer such as an optical printer or an electrophotographic printer. Although the pieces of print instruction apparatus 10A-10D (HOSTs 1-10) are assumed to have one and the same configuration and the pieces of printing apparatus 20A-20D are assumed to have one and the same configuration here, maker and model do not matter if the pieces of printing apparatus and the pieces of print instruction apparatus have compatibility and are capable of performing data exchange on the system.

The piece of print instruction apparatus 10A is chiefly constituted by a print instruction control portion 11 using a CPU. The print instruction control portion 11 is provided with a program storage portion 12, a data storage portion 13, an operating portion 14, an operation detection portion 15, a communication interface 16 and a display portion 17. The configuration of each piece of print instruction apparatus 10B, 10C, 10D is the same as that of the piece of print instruction apparatus 10A, and description thereof will be therefore omitted.

The program storage portion 12 and the data storage portion 13 are secured in a part of a storage medium such as a hard disk or a semiconductor memory. An OS (Operating System), application programs, etc. are stored in the program storage portion 12. Data generated during processing and data such as input contents or setting contents are stored in the data storage portion 13. In addition, an area for storing files made up by the application programs on the program storage portion 12 or for storing print data made up in PDL is secured in the data storage portion 13. Incidentally, examples of files to be stored in the data storage portion 13 include files produced by the application programs of the piece of print instruction apparatus 10A, files transmitted as attachments to pieces of electronic mail from the other pieces of host print instruction apparatus, and files downloaded from file servers.

The operating portion 14 is a mouse, a keyboard or the like. In the invention, the mouse is chiefly used. The operation detection portion 15 detects the cursor coordinates of the mouse. The communication interface 16 makes communication with one selected from the pieces of the printing apparatus 20A-20C through the LAN 30. The display portion 17 is a display unit using a liquid crystal display, a CRT or the like. The display portion 17 is built in the body of the piece of print instruction apparatus 10A or connected externally thereto.

Each piece of print instruction apparatus 10A, 10B, 10C, 10D transmits a file specified by the user out of the files stored in the data storage portion 13, to specified one of the pieces of printing apparatus 20A-20C through the LAN 30. In this transmission, generally used FTP (File Transfer Protocol), HTTP (Hyper Text Transfer Protocol) or the like may be used as a filer transfer protocol.

In addition, each piece of print instruction apparatus 10A, 10B, 10C, 10D receives information about the folder configuration of print conditions in a data storage portion 23 of each piece of printing apparatus 20A, 20B, 20C from the piece of printing apparatus 20A, 20B, 20C through the communication interface 16. This received information is displayed on the display portion 17. The folder configuration of the data storage portion 23 of the piece of printing apparatus 20A, 20B, 20C is displayed by icon on the display portion 17, and further the print condition item corresponding to each folder is displayed in the form of the name of the folder (print setting folder). Thus, the user can visually recognize and grasp the folder configuration about the print conditions in the data storage portion 23 of the piece of printing apparatus 20A, 20B, 20C.

Incidentally, although the display on the display portion 17 is performed by file operating software (software for operating folders or files) provided in the OS in advance, for example, a Web server may be provided on the printing apparatus 20A-20C side so that information about the print conditions settable in each piece of printing apparatus 20A, 20B, 20C is displayed by a list on the display portion 17 through the Internet. In this case, display on each piece of print instruction apparatus 10A, 10B, 10C, 10D is performed through browser software for browsing a Web site.

Next, description will be made on the configuration of the pieces of printing apparatus 20A-20C. Here, each piece of printing apparatus 20A, 20B, 20C has the same configuration, and description will be made only on the piece of printing apparatus 20A. The piece of printing apparatus 20A is chiefly constituted by a print control portion 21 constructed using a CPU and for controlling the pieces of printing apparatus 20A-20C as a whole. A data reception portion 22, a data storage portion 23, a parser portion 24, a PDL processing portion 25, a drawing processing portion 26 and a printing portion 27 are connected to the print control portion 21.

The data reception portion 22 has a communication interface function with the LAN 30. The data reception portion 22 receives print data transmitted from each piece of print instruction apparatus 10A, 10B, 10C, 10D. Further, the data reception portion 22 can identify the file type of the print data received from the piece of print instruction apparatus 10A, 10B, 10C, 10D. That is, the data reception portion 22 has a function capable of automatically judging whether the received print data is a file of data expressed in given PDL or a given application file. Incidentally, in place of this automatic judgement, the user may specify the file type of print data manually.

The data storage portion 23 stores the print data received by the data reception portion 22 and a plurality of print condition items required for printing the print data in the form of a plurality of print setting folders. The parser portion 24 parses file data produced by an application as it is, and processes the file data into a form that can be printed by the printing portion 27. The PDL processing portion 25 interprets and processes the print data expressed in PDL. The drawing processing portion 26 extracts image data from the print data acquired through the data reception portion 22. The printing portion 27 prints the print data onto specified-size paper on the basis of the image data generated by the drawing processing portion 26.

Figure 2:
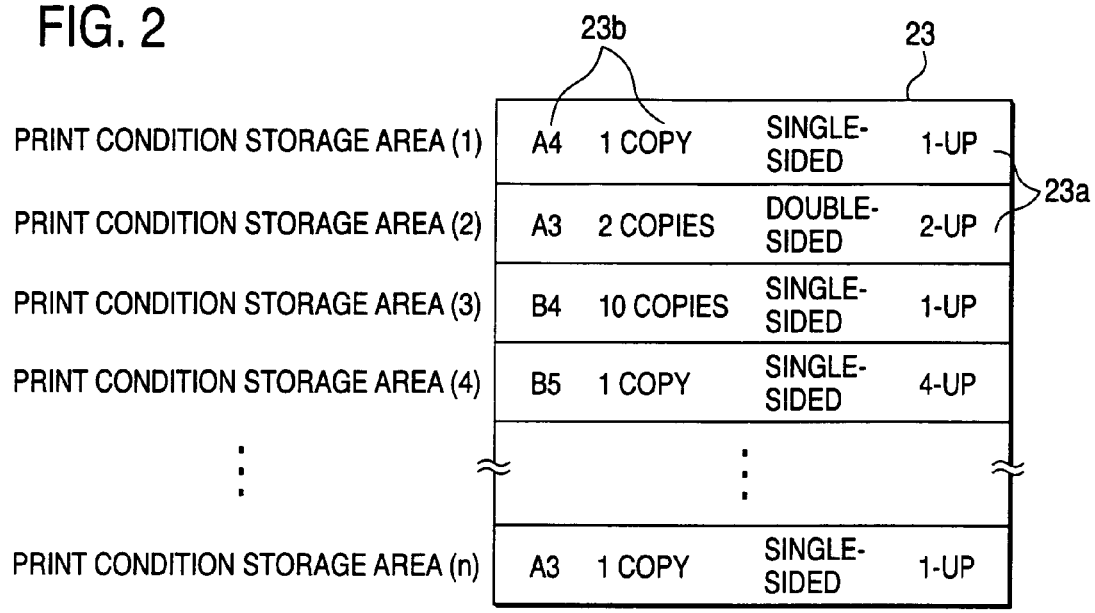
FIG. 2 is a configuration diagram showing the configuration of a data storage portion in the printing apparatus in FIG. 1.

FIG. 2 shows storage areas of the data storage portion 23 partially. As shown in FIG. 2, print condition storage areas (1)–(n) (n is a natural number) 23a are established in the data storage portion 23, and the print condition storage areas 23a have predetermined corresponding print condition items 23b defined in advance. The storage areas 23a are defined as print setting folders, and predetermined categories of print conditions, such as paper size, number of copies, double-sided/single-sided printing, and layout, and print condition items belonging to the categories are assigned to the storage areas 23a in the form of their folder names. The category of paper size has print condition items of B5, A4, B4, A3, etc. The category of number of copies has items indicating the number of copies with which the same print contents should be printed. The category of layout has items of N-UP (specifically, 1-UP, 2-UP and 4-UP) indicating the number of images to be put on one sheet of paper, and a print format suitable to a catalog. The contents of the data storage portion 23 are referred to by the connected piece of the print instruction apparatus 10A-10D when the piece of printing apparatus 20A is connected thereto.

Figure 3:
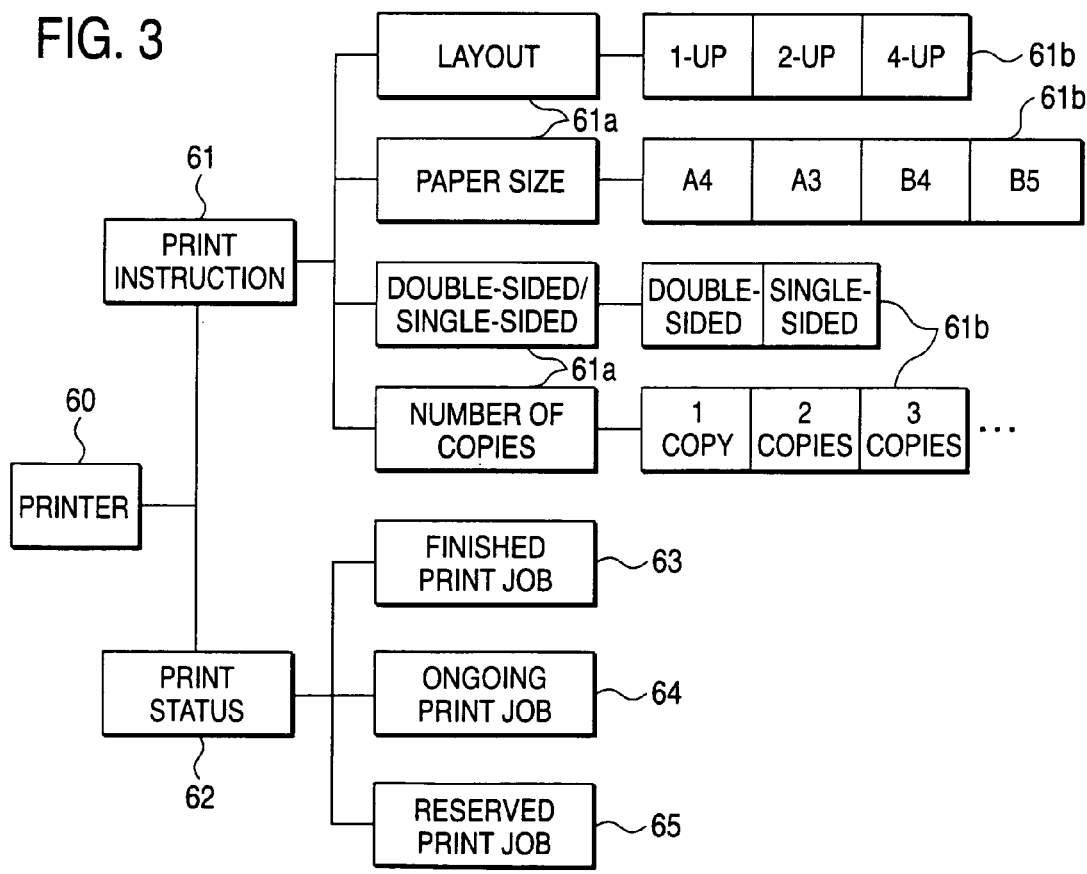
FIG. 3 is a tree diagram showing the tree structure (hierarchical structure) of print conditions according to the invention.

FIG. 3 shows a tree structure (hierarchical structure) of folders about printing according to the invention. A "Printer" folder 60 provided for each piece of printing apparatus 20A, 20B, 20C occupies the uppermost tier. A "Print Instruction" folder 61 and a "Print Status" folder 62 are located below the "Printer" folder 60. Category folders 61a indicating print conditions such as "Layout", "Paper Size", "Double-sided/Single-sided" and "Number of Copies" are located below the "Print Instruction" folder 61. In addition, print setting folders 61b corresponding to the print condition items are located below the respective category folders 61a. Below each print setting folder 61b, the other category folders 61a (not shown) that were not selected in the upper tier are located. On the other hand, a "Finished Print Job" folder 63, an "Ongoing Print Job" folder 64 and a "Reserved Print Job" (print job queue) folder 65 are located below the "Print Status" folder 62. Since the "Print Status" folder 62 is provided, the print status of transmitted data can be grasped. Thus, it is possible for the user to confirm the execution status of an ongoing print job, change the print conditions in a canceled print job or an ongoing print job, and reprint data. Such confirmation, changing or reprinting cannot be attained in the related art.

Figure 4:
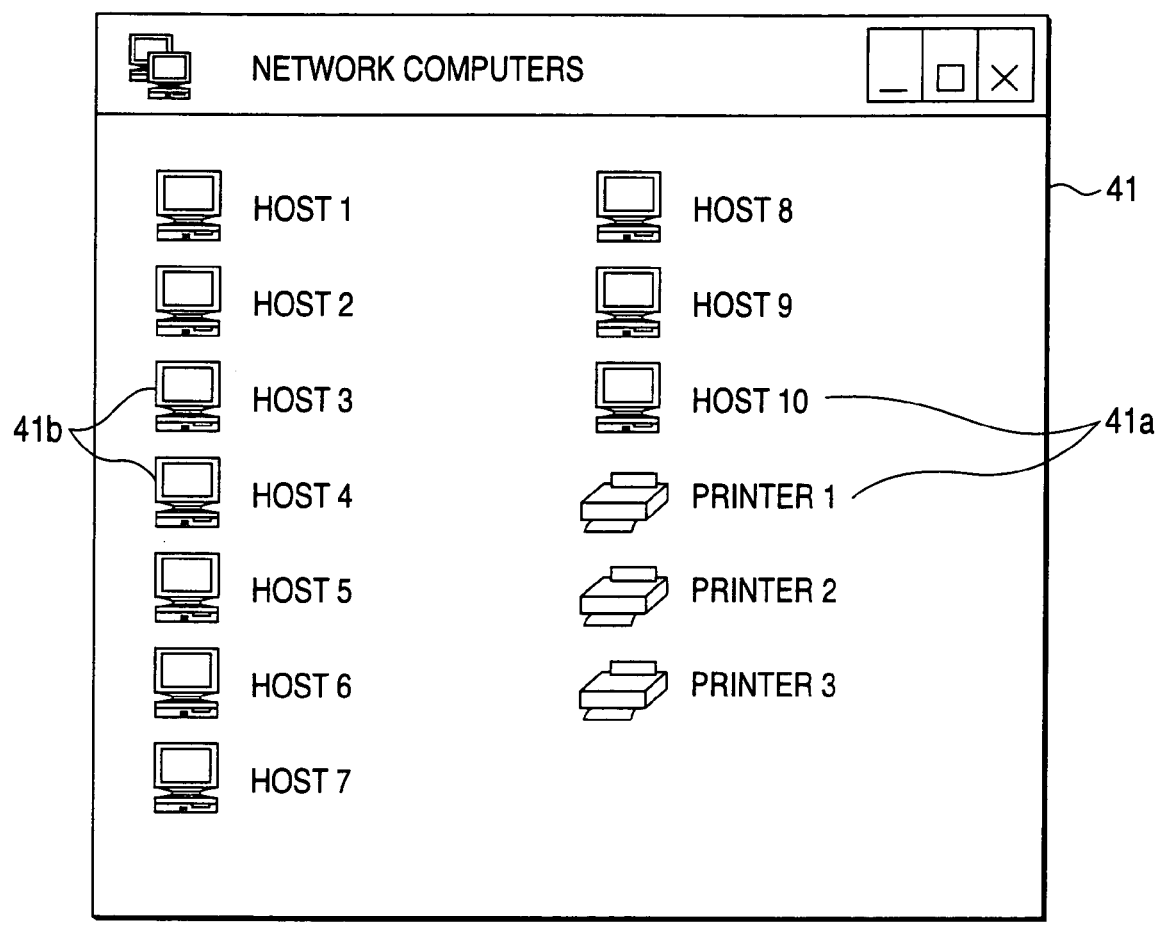
FIG. 4 is a screen view showing a display screen to be first displayed on a display portion of the print instruction apparatus when it is intended to issue a print instruction.

FIG. 4 shows a display screen to be first displayed on the display portion 17 of each piece of print instruction apparatus 10A, 10B, 10C, 10D when it is intended to issue a print instruction. In this screen 41, HOST 1 to HOST 10 correspond to the pieces of print instruction apparatus 10A to 10D, and PRINTER 1 to PRINTER 3 correspond to the pieces of printing apparatus 20A to 20C.

Figure 5:
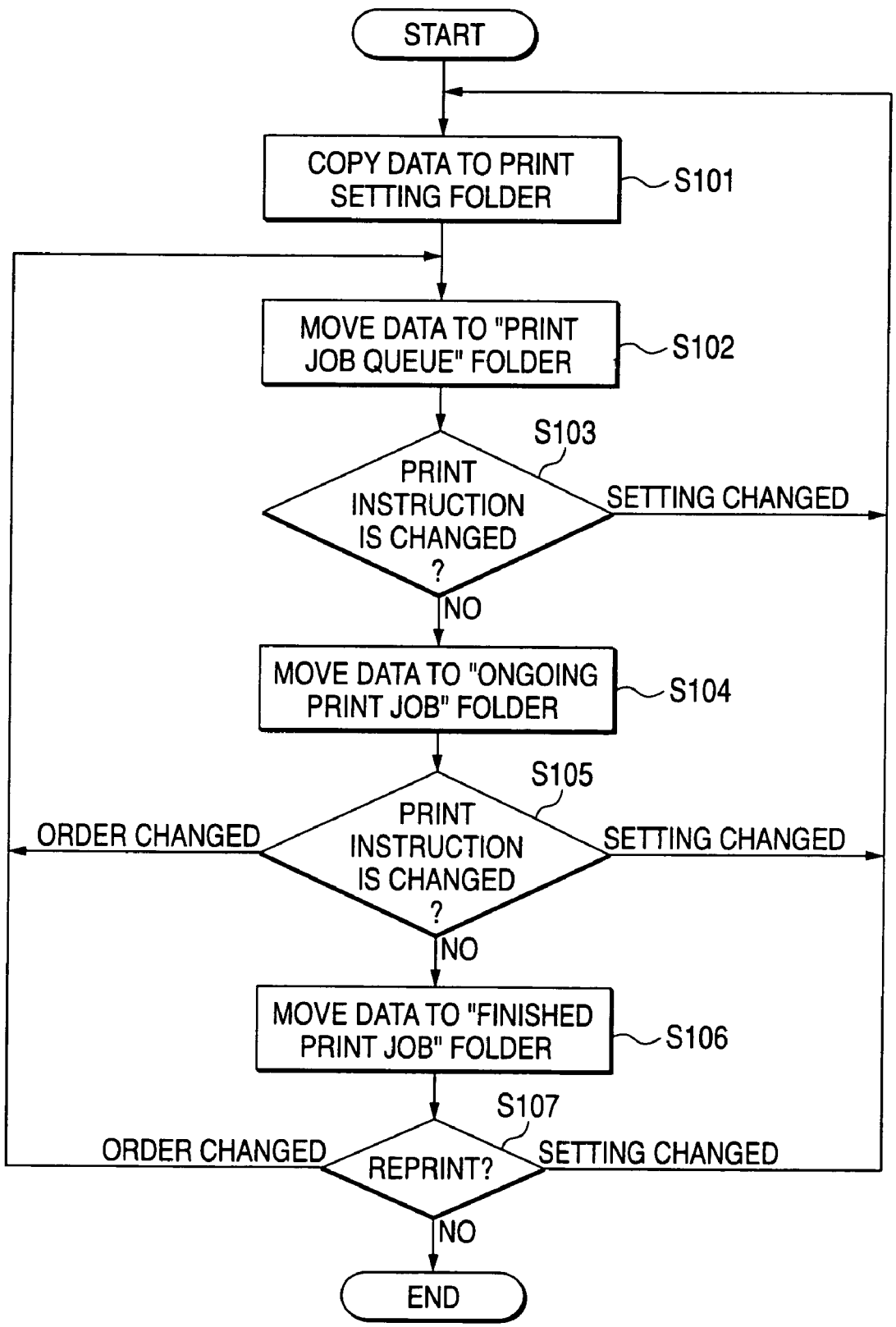
FIG. 5 is a flow chart showing processing according to the invention.

In addition, FIG. 5 shows processing according to the invention. Further, FIGS. 6 to 10, FIGS. 11A to 11C, and FIGS. 12 and 13 show the contents of respective screens to be displayed in accordance with the processing and operation according to the invention. An embodiment of the invention will be described with reference to FIGS. 1 10, FIGS. 11A to 11C, and FIGS. 12 and 13.

For example, assume that the piece of printing apparatus 20A (PRINTER 1) is specified by the piece of print instruction apparatus 10A (HOST 1) so as to print print data. In this case, when the user operates the operating portion 14 to perform a predetermined input operation, the display screen 41 having the contents shown in FIG. 4 is displayed on the display portion 17 of the piece of print instruction apparatus 10A. On the display screen 41, icons 41b and icon names 41a of a plurality of pieces of printing apparatus (PRINTERs 1-3) are displayed together with those of the other pieces of print instruction apparatus (HOSTs 2-10) connected to the LAN 30.

When the user operates the operating portion 14 on the screen 41 so as to select the "PRINTER 1", connection to the piece of printing apparatus 20A is made. Then, the folders 60 to 64 about printing are displayed on a screen 50 of FIG. 6 in the form of a tree structure (having contents corresponding to those of FIG. 3, but a part of the contents are omitted in FIG. 6 for the sake of avoiding making the screen complicated) The folders to be displayed are roughly constituted by the "Print Instruction" folder 61 for print instruction and the "Print Status" folder 62 for confirming print status. These folders are displayed on the left of the screen. The "Finished Print Job" folder 63, the "Ongoing Print Job" folder 64 and the "Reserved Print Job" folder 65 are associated with the "Print Status" folder 62. In addition, the details of these folders 63, 64 and 65 are displayed on the right of the screen.

Figure 6:
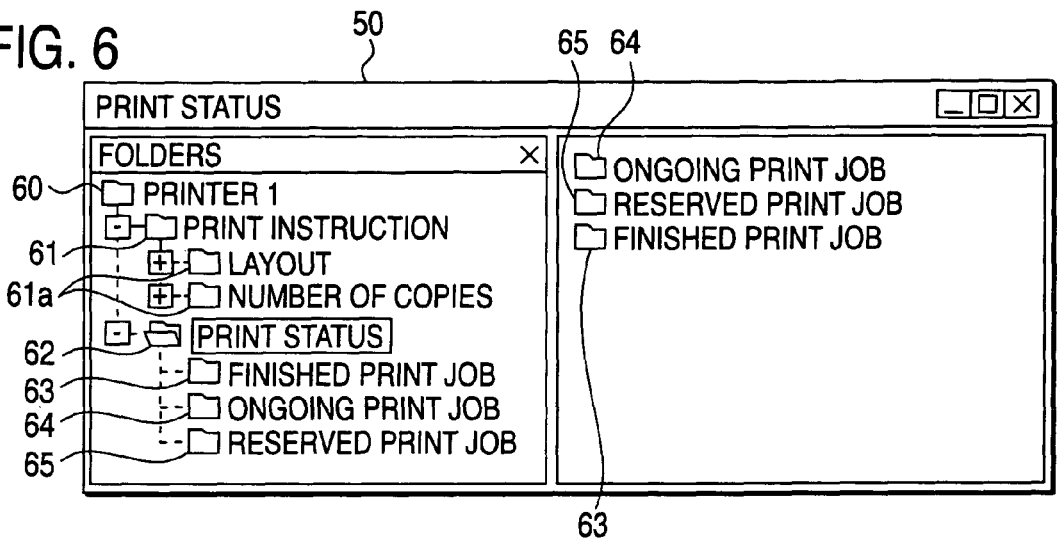
FIG. 6 is a screen view showing the display details when a print status folder is opened.

First, when print data is moved (dragged and dropped) or copied to any one of the print setting folders 61b belonging to the "Print Instruction" folder 61 on the screen 50 of FIG. 6, a print instruction is issued (S101) so that the print data and the print instruction are transmitted to the piece of printing apparatus 20A. The print data moved or copied to the print condition item folder 61b can be referred to through the "Reserved Print Job" folder 65 in the "Print Status" folder 62. When the "Reserved Print Job" folder 65 is opened in FIG. 6, there appears a screen 51 of FIG. 7.

Figure 7:
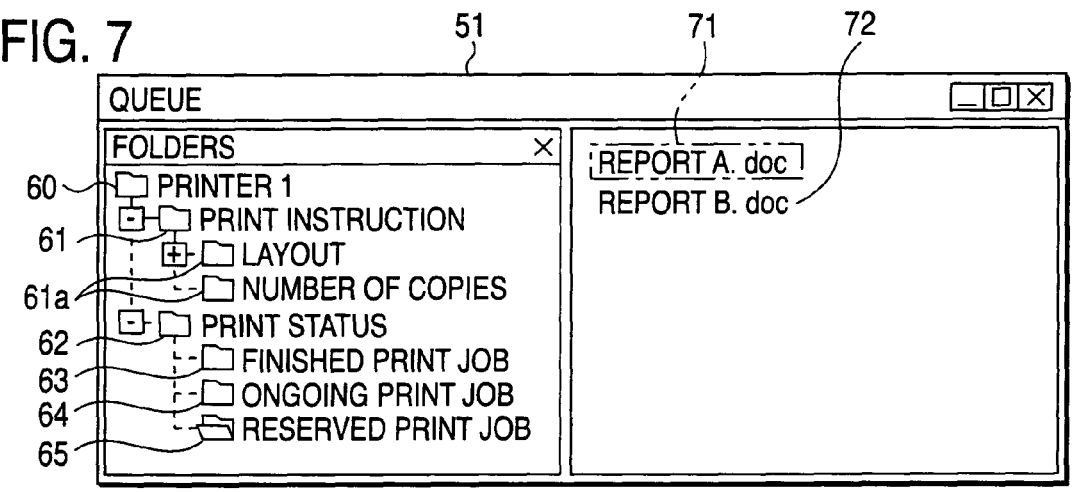
FIG. 7 is a screen view showing the display details of print job queue.

FIG. 7 shows the screen 51 when the "Reserved Print Job" folder 65 is opened. Two pieces of print data, that is, print data 71 of "ReportA.doc" and print data 72 of "ReportB.doc" are displayed on the right of the screen 51. Thus, it can be understood that the two pieces of print data 71 and 72 are print job queues (S102). Here, when the print instruction is changed (S103), the routine of processing is returned to Step S101, and the processing in and after Step S101 is executed again. When the print job for the print data in the print job queue is started, the print data is moved to the "Ongoing Print Job" folder 64 (S104).

Figure 8:
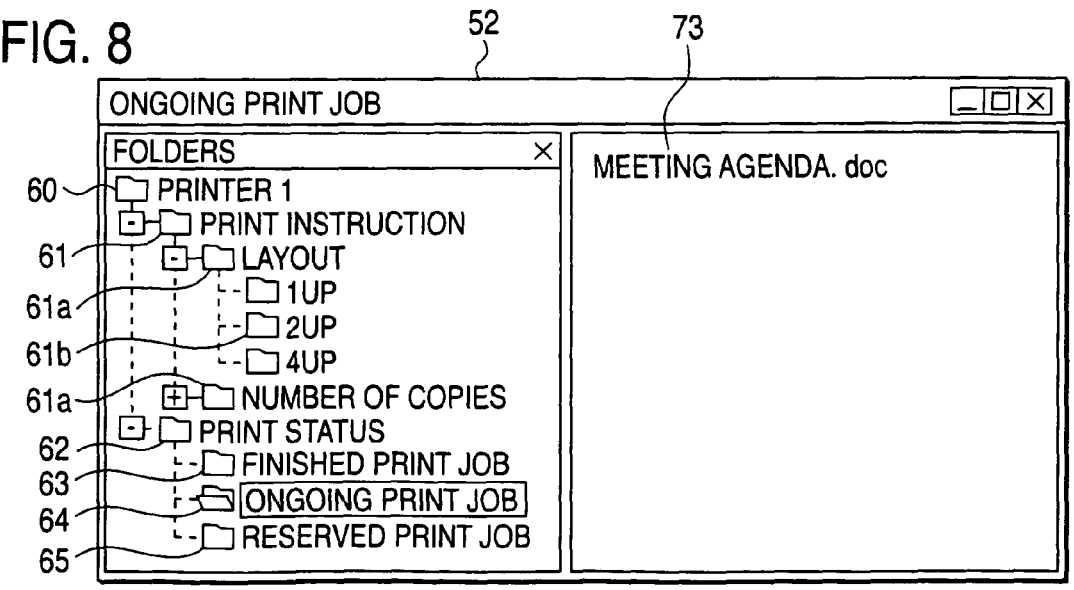
FIG. 8 is a screen view showing the display details when an ongoing print job folder is opened.

FIG. 8 shows a screen 52 when the "Ongoing Print Job" folder 64 is opened. Print data 73 of "MeetingAgenda.doc" is displayed on the right of the screen 52. Thus, it can be understood that the print job for the print data 73 of "MeetingAgenda.doc" is ongoing. Here, when the print instruction is changed (S105), the routine of processing is returned to Step S101, and the processing in and after Step S101 is executed again. When the print job is finished, the print data 73 in the "Ongoing Print Job" folder 64 is moved to the "Finished Print Job" folder 63.

Figure 9:
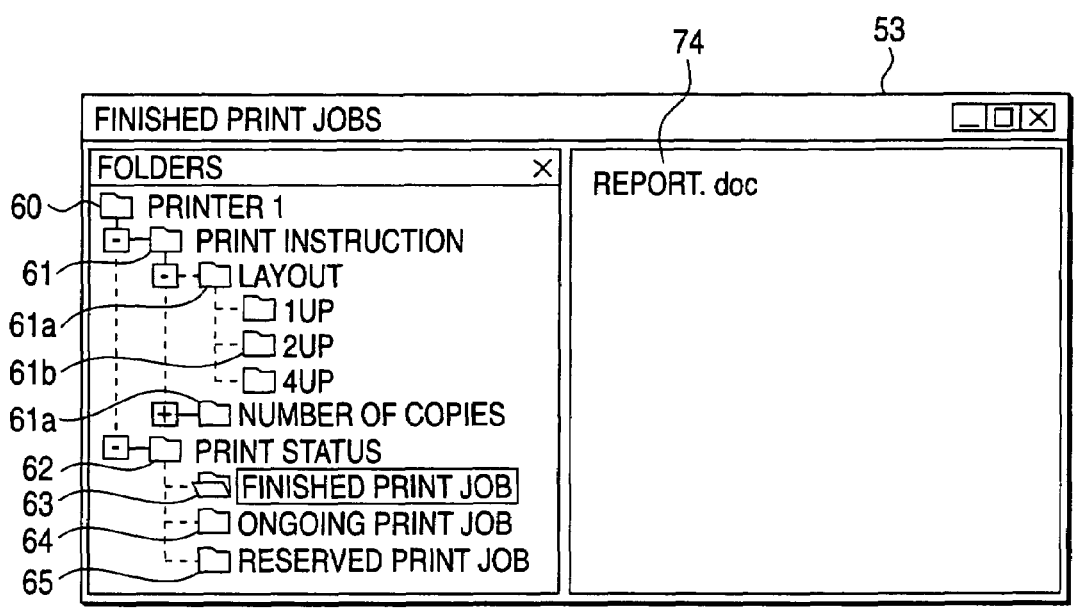
FIG. 9 is a screen view showing the display details when a finished print job folder is opened.

FIG. 9 shows a screen 53 when the "Finished Print Job" folder 63 is opened. Print data 74 of "Report.doc" is displayed on the right of the screen 53. In such a manner, the user can recognize that the print job for the print data 74 of "Report.doc" has been finished. Here, when there is no instruction to reprint the print data 74, the processing in terms of print instruction is terminated entirely. On the other hand, when there is an instruction to reprint the print data 74 (S107), the routine of processing returns to Step S101 in the case where the setting is changed (or in the case where the setting is not changed). The routine of processing returns to Step S102 in the case where the printing order is changed. Reprinting is carried out while grasping the print instruction and the print status.

Figure 10:
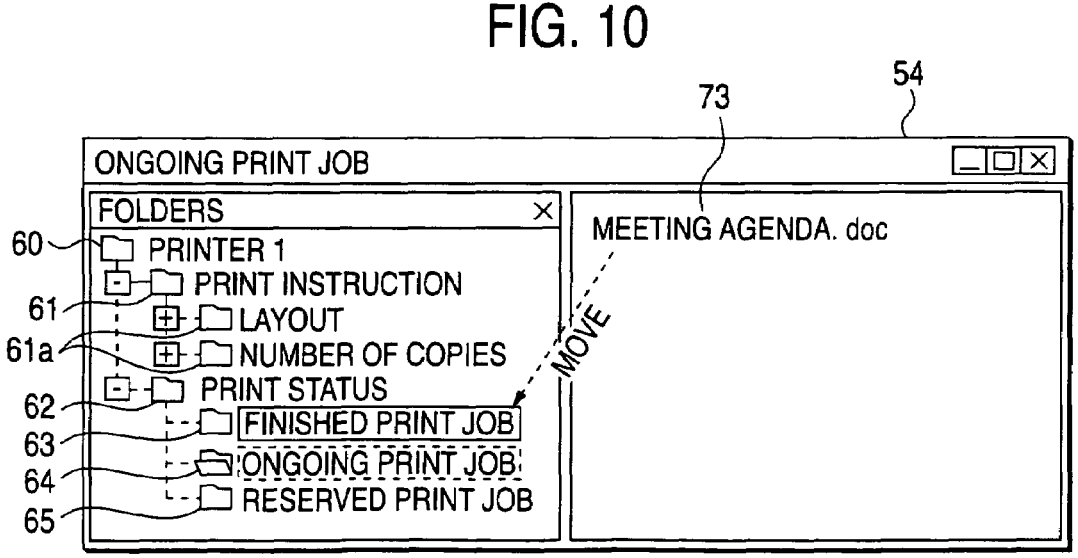
FIG. 10 is a screen view showing the display details when a print job is canceled.
Figure 11A:
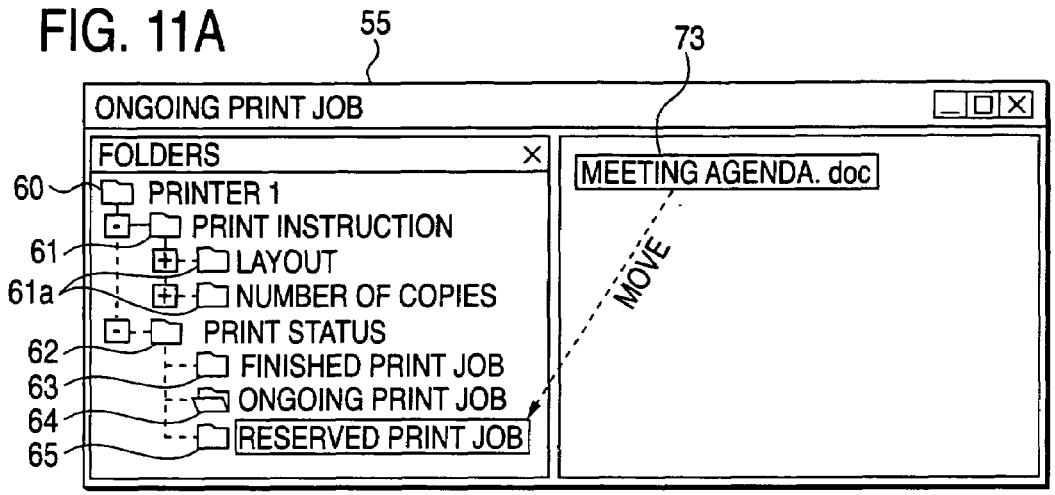
FIGS. 11A to 11C are screen views showing the display details when the printing order is changed.
Figure 11B:
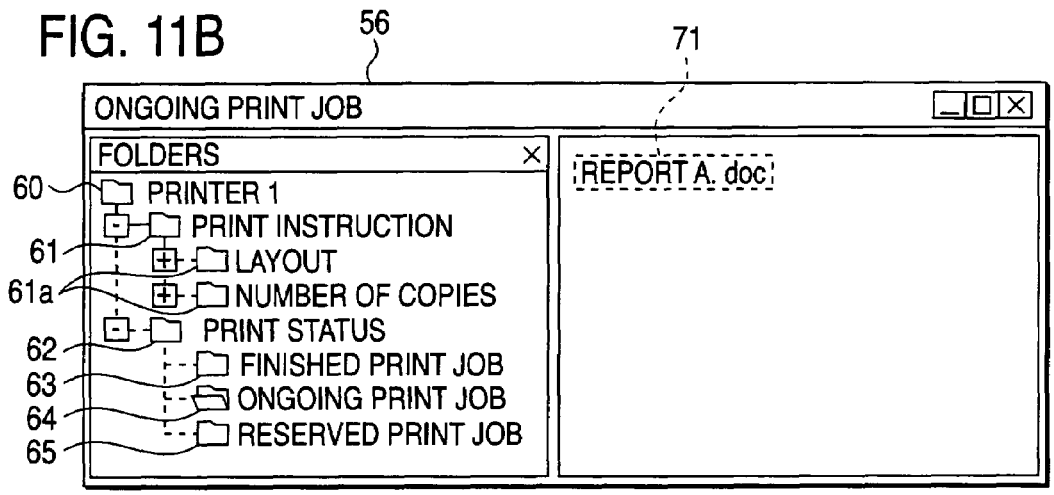
Figure 11C:
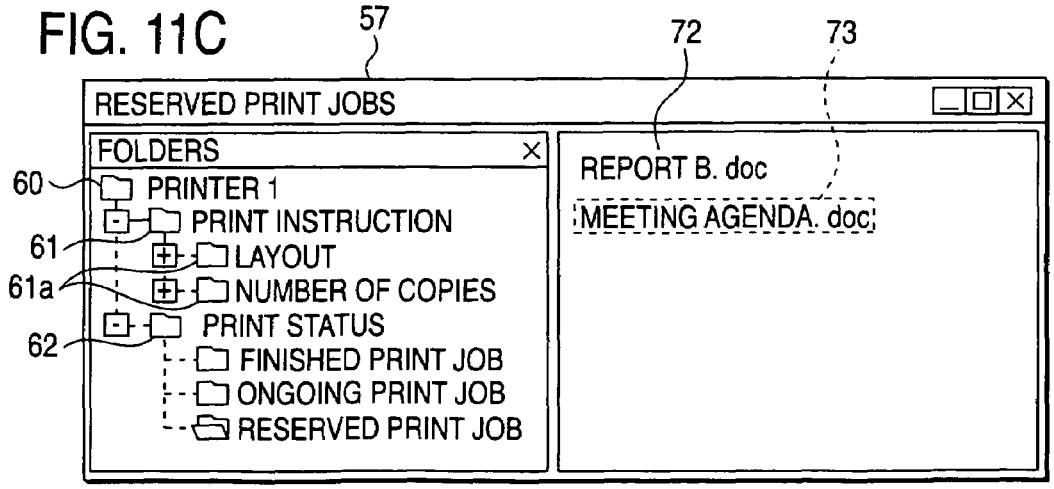
Figure 12:
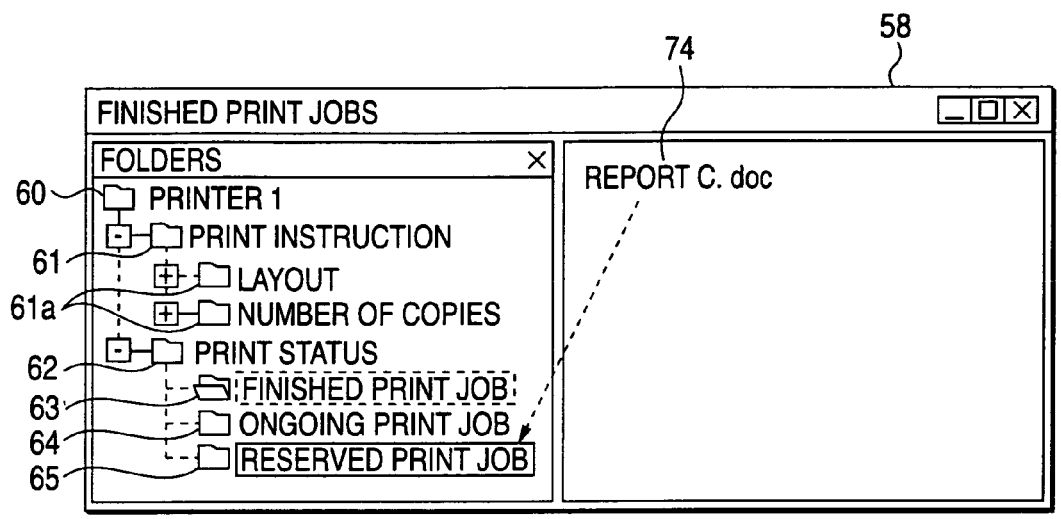
FIG. 12 is a screen view showing the display details when a reprint instruction is issued.

Now, description will be made on the method for canceling a print job. When an "Ongoing Print Job" screen 54 of FIG. 10 is displayed, the user opens the "Ongoing Print Job" folder 64, and moves the print data 73 of "MeetingAgenda.doc" displayed on the screen 54 to the "Finished Print Job" folder 63. In this manner, the print job for the print data 73 of "MeetingAgenda.doc" is canceled.

Next, description will be made on the processing (jumping from S107 to S102) for changing the printing order in Step S107. As shown in a screen 55 of FIG. 11A, the "Ongoing Print Job" folder 64 is opened, and the print data 73 of "MeetingAgenda.doc" displayed on the screen 55 is moved to the "Reserved Print Job" folder 65. By this operation, the print job for the print data 73 can be put in the last turn of the queue. At this time, on the assumption that there are two pieces of print data of "ReportA.doc" and "ReportB.doc" in the "Reserved Print Job" folder 65, the print data 71 of "ReportA.doc" becomes ongoing as shown in a screen 56 of FIG. 11B. Then, the two pieces of the print data 72 of "ReportB.doc" and the print data 73 of "MeetingAgenda.doc" are stored as queue in the "Reserved Print Job" folder 65 as shown in a screen 57 of FIG. 11C. On this occasion, "ReportA.doc", "ReportB.doc" and "MeetingAgenda.doc" are arranged in that printing order.

Figure 13:
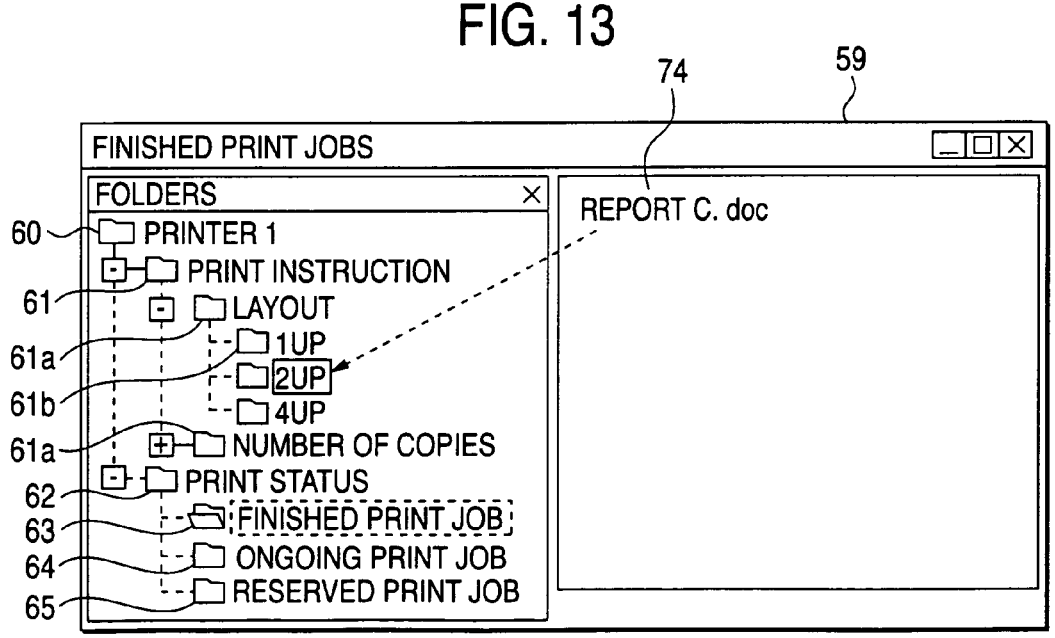
FIG. 13 is a screen view showing the display details of a reprint instruction according to another method.

Next, description will be made on the method for issuing an instruction to reprint. In a screen 58 of FIG. 12, print data 74 of "ReportC.doc" is moved to the "Reserved Print Job" folder 65. By this operation, an instruction to print the print data 74 of "ReportC.doc" is issued with the setting of the same print conditions as those in the last printing. On the other hand, when the print data 74 of "ReportC.doc" is moved to another print setting item folder 61b as shown in FIG. 13, an instruction to print the print data 74 of "ReportC.doc" is issued with new conditions (layout and the like). In the case of FIG. 13, printing is performed by 2UP (printing two images on one sheet of paper).

As described above, according to this embodiment, the processing status of data transmitted by the user can be confirmed on the same screen as the UI screen for setting the print conditions. In addition, when data transmitted once is moved from the "Ongoing Print Job" folder 64 to the "Finished Print Job" folder 63, printing of the data can be canceled. On the other hand, when the data transmitted once is moved from the "Ongoing Print Job" folder 64 to the "Reserved Print Job" folder 65 (print job queue folder), the printing order can be changed. Further, only if the data is moved from the "Finished Print Job" folder 63 to the "Reserved Print Job" folder 65 again, reprinting of the data can be carried out with the same or different conditions without transmitting the print data again.

Incidentally, although the embodiment assumes that print data is made up by the pieces of print instruction apparatus 10A-10D, not to say, the invention may include the case where print data made up by another apparatus (for example, a dedicated word processor, another PC, or the like) is read in the pieces of print instruction apparatus 10A-10D. Examples of sources from which such print data is read include networks and storage media (such as a magnetic disk, a CD-ROM, a CD-RW and a memory card).

As is apparent from above, in print instruction apparatus and a print instruction method according to the invention, a print status folder group for confirming print status is displayed together with a print instruction folder group for setting print conditions. Accordingly, not only it is possible to confirm execution status about any ongoing print job but it is also possible to change print conditions and reprint print data in any case of a canceled print job, an ongoing print job and a finished print job. Thus, it is possible to improve the user-friendliness.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A print instruction apparatus for presenting print conditions required for printing print data to a printing apparatus comprising:

a display unit that displays print instruction folders, print status folders, and print data on a display screen, each print instruction folder being associated with a print condition, the print instruction folders being divided hierarchically according to the print conditions, the print status folders being associated with a print status and including a finished print job folder, an ongoing print folder, and a reserved print job folder;

an operating unit that allows a user to place the print data into the print instruction folders and the print status folders; and a control unit that controls, when the print data is placed into one of the print instruction folders a print condition of the print data so that the print data is printed with the print condition associated with the one of the print instruction folders, and, when the print data is placed into one of the print status folders a print status of the print data in accordance with print status associated with the one of the print status folders.

2. The print instruction apparatus according to claim 1, wherein the control unit executes processing corresponding to item contents of a desired folder of the finished print job folder, the ongoing print job folder and the reserved print job folder when the print data is moved or copied into the desired folder.

3. The print instruction apparatus according to claim 1, wherein the control unit makes the display unit display one of ongoing print data whose print job is ongoing, reserved print data whose print job is reserved, and finished print data whose print job is finished, in accordance with an opened one of the finished print job folder, the ongoing print job folder and the reserved print job folder, the print data being displayed on the display screen together with the finished print job folder, the ongoing print job folder and the reserved print job folder.

4. The print instruction apparatus according to claim 3, wherein the control unit makes the display unit display the reserved print data by a list as print job queue data together on the display screen when the reserved print job folder is opened.

5. The print instruction apparatus according to claim 3, wherein the control unit issues an instruction to stop or cancel an ongoing print job in accordance with an operation of deleting or moving print data on the display screen when the ongoing print job folder is opened.

6. The print instruction apparatus according to claim 4, wherein the control unit issues an instruction to cancel the print job queue data in accordance with an operation of deleting or moving the print data on the display screen.

7. The print instruction apparatus according to claim 3, wherein the control unit executes printing under conditions with which a desired folder of the print instruction folders is workable, in accordance with an operation of moving or copying the print data to the desired folder when the finished print job folder is opened.

8. The print instruction apparatus according to claim 3, wherein the control unit executes printing under conditions the same as immediately preceding conditions in accordance with an operation of moving the print data to the reserved print job folder when the finished print job folder is opened.

9. The print instruction apparatus according to claim 3, wherein the control unit changes a print job order in accordance with an operation of moving print data on the display screen to the reserved print job folder when the ongoing print job folder is opened.

10. The print instruction apparatus according to claim 1, wherein the control unit instructs on printing the print data under print conditions by moving or copying the print data to each of the print instruction folders, the print conditions being related to the print instruction folders, respectively.

11. The print instruction apparatus according to claim 1, wherein the print status folders comprise a first print instruction folder, and print the print data based on print conditions assigned to the first print instruction folder by moving or copying the print data to the first print instruction folder.

12. The print instruction apparatus according to claim 1, wherein each of the print instruction folders is allocated according to the print conditions being related to at least one of a layout, a paper size, a double-sided or singled-sided, and the number of copies.

13. A print instruction method for setting print conditions through a print instruction apparatus and printing print data under the print conditions through a printing apparatus, the method comprising:

displaying print instruction folders, print status folders, and print data on a display screen, each print instruction folder being associated with a print condition, the print instruction folders being divided hierarchically according to the print conditions, the print status folders being associated with print status and including a finished print job folder, an ongoing print job folder, and a reserved print job folder;

operating to place the print data into the print instruction folders and the print status folders; and controlling, when the print data is placed into one of the print instruction folders a print conditions of the print data so that the print data is printed with the print condition associated with the one of the print instruction folders, and, when the print data is placed into one of the print status folders a print status of the print data in accordance with the print status associated with the one of the print status folders.

14. The print instruction method according to claim 13, wherein the controlling makes the displaying display the reserved print data by a list as print job queue data together on a display screen when the reserved print job folder is opened.

15. The print instruction method according to claim 13, wherein the controlling issues an instruction to stop or cancel an ongoing print job in accordance with an operation of deleting or moving print data on a display screen when the ongoing print job folder is opened.

16. The print instruction method according to claim 14, wherein the controlling issues an instruction to cancel the print job queue data in accordance with an operation of deleting or moving the print data on a display screen.

17. The print instruction method according to claim 13, wherein the controlling executes printing under conditions with which a desired folder of the print instruction folders is workable, in accordance with an operation of moving or copying the print data to the desired folder when the finished print job folder is opened.

18. The print instruction method according to claim 13, wherein the controlling executes printing under conditions the same as immediately preceding conditions in accordance with an operation of moving the print data to the reserved print job folder when the finished print job folder is opened.

19. The print instruction method according to claim 13, wherein the controlling changes a print job order in accordance with an operation of moving print data on the display screen to a reserved print job folder when the ongoing print job folder is opened.

20. The print instruction method according to claim 13, wherein the print status folders comprise a first print instruction folder, and print the print data based on print conditions assigned to the first print instruction folder by moving or copying the print data to the first print instruction folder.

* * * * *